US012186597B2

(12) United States Patent
Cho

(10) Patent No.: US 12,186,597 B2
(45) Date of Patent: Jan. 7, 2025

(54) ROTATABLY ADJUSTABLE FACE MASK VALVE

(71) Applicant: MAKRITE INDUSTRIES INC., New Taipei (TW)

(72) Inventor: Shih-Shiung Cho, Taipei (TW)

(73) Assignee: MAKRITE INDUSTRIES INC., New Taipei (TW)

( * ) Notice: Subject to any disclaimer, the term of this patent is extended or adjusted under 35 U.S.C. 154(b) by 606 days.

(21) Appl. No.: 17/577,690

(22) Filed: Jan. 18, 2022

(65) Prior Publication Data

US 2023/0226384 A1 Jul. 20, 2023

(51) Int. Cl.
*A62B 18/10* (2006.01)
*A41D 13/11* (2006.01)

(52) U.S. Cl.
CPC .............. *A62B 18/10* (2013.01); *A41D 13/11* (2013.01)

(58) Field of Classification Search
CPC ................................ A62B 18/10; A41D 13/11
See application file for complete search history.

(56) References Cited

U.S. PATENT DOCUMENTS 3,474,783 A * 10/1969 Ulmann ................. A62B 18/10 137/529
4,550,749 A * 11/1985 Krikorian ............. F16K 15/148 137/854
5,203,872 A * 4/1993 Naffziger .............. F16K 15/148 137/854
5,931,189 A * 8/1999 Sweeney ............... F16K 15/148 206/524.8
6,648,004 B2 * 11/2003 Lau ....................... F16K 15/148 137/232
2005/0211319 A1 * 9/2005 Kobetsky ............. F16K 15/148 137/854
2006/0144453 A1 * 7/2006 Steele ................... F16K 15/141 137/854
2014/0373953 A1 * 12/2014 Spanevello ........... F16K 15/148 137/859

* cited by examiner

*Primary Examiner* — Patrick C Williams
(74) *Attorney, Agent, or Firm* — Rabin & Berdo, P.C.

(57) ABSTRACT

A rotatably adjustable face mask valve includes a valve seat, a flap and a valve cover. The valve cover includes a fixed member and a movable member that is movable to different height positions relative to the fixed member and includes a pressing portion. When a user holds and rotates the movable member, the pressing portion is movable between a closed position of pressing against the flap, and an open position of separating from the flap. An opening on the valve seat is constantly in a blocked state when the pressing portion is in the closed position, or is subject to user's exhalation to change between the blocked state and a circulating state when the pressing portion is in the open position. Thus, the user may adjust the usage state of the face mask valve according to personal need and change the way the exhaled air leaves the face mask.

9 Claims, 19 Drawing Sheets

ROTATABLY ADJUSTABLE FACE MASK VALVE

FIELD OF THE INVENTION

The present invention relates to a face mask valve that is rotatable to change between different usage states, and more particularly, to a face mask valve including a valve seat that can be rotated to press against or separate from a flap of the face mask valve.

BACKGROUND OF THE INVENTION

There are various kinds of bacteria, viruses and airborne hazardous substances existed in nature. Particularly, viruses can be transmitted via respiratory droplets and air, and people who inhaled such droplets and air are subject to airborne infection and droplet infection. Therefore, face masks are used by people to isolate them from airborne impurities and viruses.

To effectively stop viruses from invading human body, the currently available face masks are generally made of several layers of fabrics to filter hazardous bacteria and viruses. The multi-layer face masks inevitably cause muggy and humid feeling to people who need to wear the face masks over a long time in a high temperature working environment. In addition to making users feel uncomfortable, wet face masks also tend to provide less protection against viruses.

Therefore, a face mask with breathing valve has been developed and introduced into the market. While the breathing valve allows air to circulate through the face mask to solve the problems of causing muggy and humid feeling to wearers, dirt in air and some hazardous substances tend to enter the breathing valve via an opening thereof and be adsorbed on a filter of the breathing valve when the breathing valve is not in use. The wearer will very possibly inhale air along with these dirt and hazardous substances when wearing the face mask next time to thereby cause harm to the wearer's body.

It can be found from earlier cases that a breathing valve capable of regulating breathing stream usually involves a relatively complicate structure and accordingly, a considerably high production cost. Therefore, a face mask with breathing valve is normally used in professional fields, such as medical care and disaster relief, but not frequently applied in daily life.

SUMMARY OF THE INVENTION

A primary object of the present invention is to provide a rotatably adjustable face mask valve, which allows a user to adjust an amount of exhaled air to be discharged via the face mask valve according to personal need, or to change the face mask valve to a closed state in which exhaled air is not discharged via the valve seat, so as to change the usage state of a breathing face mask.

Another object of the present invention is to provide a face mask valve, which includes a valve seat and a valve cover that can be quickly aligned with and assembled to each other in any cardinal directions or in a plurality of specific cardinal directions, so as to enable upgraded productivity of the face mask valve.

A further object of the present invention is to provide a face mask valve, which includes a valve cover having a fixed member for limiting a range of movement and a movable member being rotatable to change its height position relative to the fixed member, so that a usage state of the face mask valve is changeable with the height position of the movable member. Meanwhile, the movable member and the fixed member together form an ornamental surface to give the face mask valve an aesthetic appearance.

A still further object of the present invention is to provide a face mask valve, which includes a movable member that allows stepped adjustment in a height position relative to a fixed member, so that a user may manually rotate the movable member to adjust an amount of exhaled air to be discharged from the face mask valve according to personal need.

To achieve the above and other objects, the rotatably adjustable face mask valve according to the present invention includes a valve seat having an opening located around a central axis of the face mask valve and including a first engaging section and a second engaging section provided around the opening; a flap being mounted on the second engaging section to block the opening, and the flap being deformable by a user's exhaled air to thereby change the opening from a blocked state into a circulating state; and a valve cover including a fixed member and a movable member movable relative to the fixed member. The fixed member has a fixing end that is extended through the movable member to connect to the first engaging section, such that a pressing portion of the movable member is located at a closed position to contact with the flap. And the fixed member and the movable member have at least one protruded block and at least one guide groove provided between them, such that the movable member is rotatable about the central axis to an open position for separating the pressing portion from the flap.

When the pressing portion is moved to the closed position, the opening is kept in the blocked state permanently; and when the pressing portion is moved to the open position, the opening is subject to the user's exhaled air and is changeable between the blocked state and the circulating state.

The first engaging section includes an annular wall and a plurality of stoppers. The annular wall includes a neck portion formed with a sideward opened annular groove and a top portion in contact with a radially outer area of the flap. The stoppers are circumferentially spaced between the neck portion and a base of the valve seat. And, the second engaging section includes a supporting member connected to the annular wall of the first engaging section and a shaft extended from the supporting member.

The fixed member includes a ring portion and a plurality of extending sections downward extended from the ring portion. The extending sections are formed at their respective lower inner side with a retaining protrusion for engaging with the annular groove, and on their respective outer surface with the at least one guide groove. The annular wall of the first engaging section is divided by the stoppers into a plurality of fixing zones, and the extending sections are circumferentially spaced along the ring portion. And, the extending sections are sized corresponding to the fixing zones, such that each of the extending sections can be extended through one of the fixing zones and the fixed member is selectively connectable to the valve seat in different cardinal directions.

The movable member further includes an outer ring portion located around an outer periphery of the pressing portion, such that an extending space is defined between the outer ring portion and the pressing portion. The extending space is divided into a plurality of extending zones by a plurality of connecting legs that are provided between the outer ring portion and the pressing portion. And, the protruded blocks are spaced along the outer ring portion to radially extend into the extending zones.

The fixed member is extended through the movable member by downward extending the extending sections of the fixed member through the extending zones of the movable member, such that the protruded blocks are pushed by the extending sections to flex radially outward until the protruded blocks are located adjacent to the guide grooves on the extending sections. And then, the protruded blocks automatically flex radially inward and move into the guide grooves. The at least one guide groove is formed with a vertical section, a slant section, and at least one depressed section located on a lower surface of the slant section, such that the pressing portion can be located at the open position, the closed position or at least one adjustment position that is located between the open position and the closed position.

In another embodiment of the present invention, the first engaging section includes an annular wall, the annular has a neck portion formed with a sideward opened annular groove and a top portion, with a plurality of insertion slots. The second engaging section includes a supporting member connected to the annular wall of the first engaging section, and a round hole formed on the supporting member. The flap includes a flat blocking sheet and a pin downward extended from the flat blocking sheet; and the pin of the flap is extendable into the round hole on the second engaging member for a radially outer area of the flat blocking sheet to contact with the top portion of the first engaging section.

In the above embodiment, the fixed member includes a top cover portion and a plurality of extending sections downward extended from the top cover portion. The extending sections are formed on their respective outer surface with the at least one guide groove. And, the extending sections are further formed on their respective inner surface with a retaining protrusion for engaging with the sideward opened annular groove and a rib for engaging with the insertion slots on the first engaging section, such that the fixed member can be freely connected to the valve seat in any cardinal direction.

The present invention is characterized in that the valve cover provided on the breathing face mask includes the movable member and the fixed member, and that at least one protruded block and at least one guide groove are provided between the movable and the fixed member. When the breathing face mask is in use, the movable member can be rotated about a central axis to an open position, so that the opening on the valve seat is in a circulating state. Then, the movable member can be rotated to a closed position for the opening to be fully blocked. That is, when the user does not want to use the face mask valve, the opening can be sealed to prevent air from getting in the breathing face mask via the face mask valve and prevent adsorption of hazardous substances on the flap of the face mask valve.

The present invention is also characterized in that the valve seat includes the neck portion with a sideward opened annular groove and a plurality of stoppers, so that the fixed member can be assembled to the valve seat in any cardinal direction. In another embodiment, the stoppers are replaced with a plurality of insertion slots circumferentially spaced along a top portion of the annular wall, and the valve cover includes ribs for engaging with the insertion slots. With these arrangements, the fixed member can also be assembled to the valve seat in any cardinal direction to enable increased assembling speed, making the face mask valve more convenient for use.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
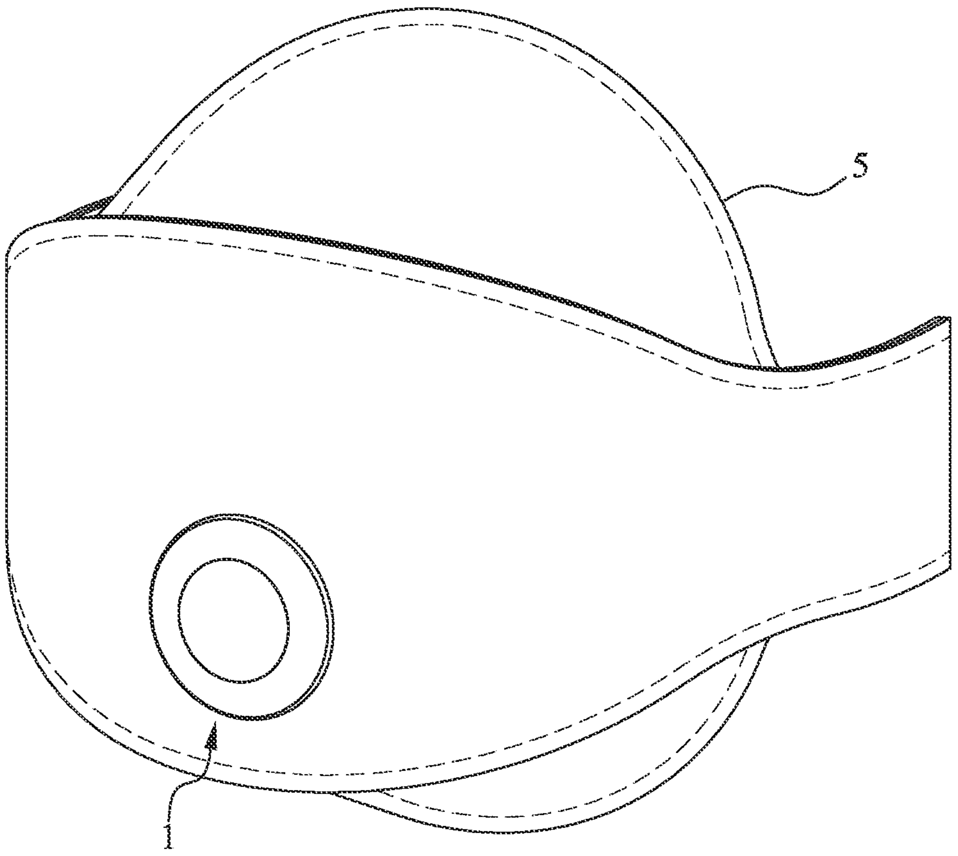
FIG. 1 is a perspective view showing a breathing face mask with a face mask valve of the present invention mounted thereon.

The present invention will now be described with some preferred embodiments thereof and by referring to the accompanying drawings. For the purpose of easy to understand, elements that are the same in the preferred embodiments are denoted by the same reference numerals.

Please refer to FIG. 1. The present invention refers to a rotatably adjustable face mask valve 1 for mounting on a breathing face mask 5. When a user wearing the breathing face mask 5 inhales, external air can get in the breathing face mask 5 via only fine pores of the breathing face mask 5 but not via the face mask valve 1. On the other hand, when the user wearing the breathing face mask 5 exhales, only a small part of exhaled air leaves the breathing face mask 5 via the fine pores thereof while a large part of the exhaled air leaves the breathing face mask 5 via the face mask valve 1. In FIG. 1, there is shown only one face mask valve 1 provided on one side of the breathing face mask 5. However, it is understood FIG. 1 is only illustrative to facilitate easy explanation of the present invention and does not limit the location and quantity of the face mask valve 1 on the breathing face mask 5 in any way.

Figure 2:
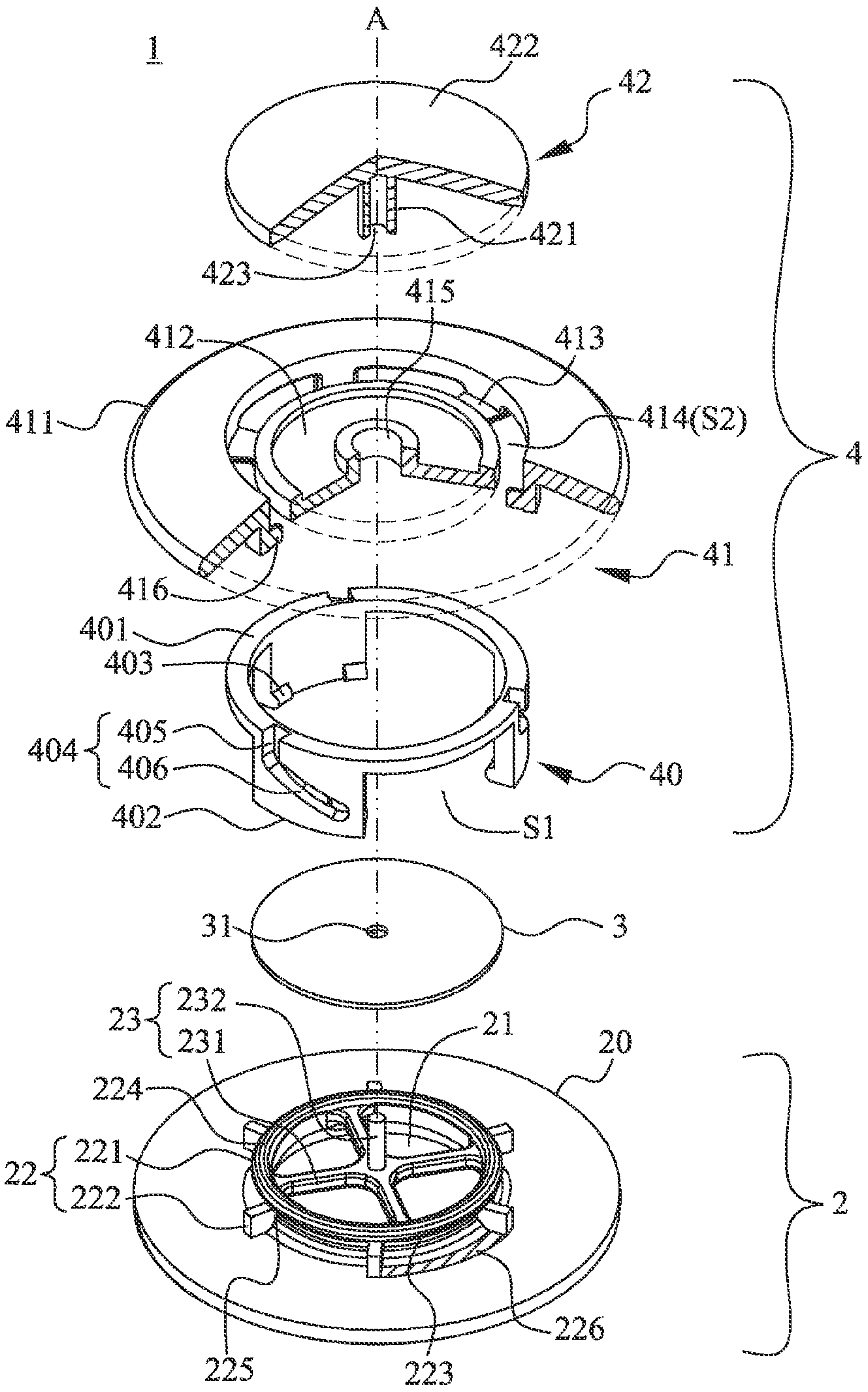
FIG. 2 is an exploded perspective view of the face mask valve according to a first embodiment of the present invention.

Please refer to FIG. 2, in which a first embodiment of the face mask valve 1 of the present invention is shown. As shown, in the first embodiment, the face mask valve 1 includes a valve seat 2, on which a flap 3 is disposed, and a valve cover 4 assembled to a top of the valve seat 2, such that the flap 3 is located between the valve seat 2 and the valve cover 4.

The valve seat 2 includes an annular base 20 defining an opening 21 located around a central axis A of the valve seat 2; a first engaging section 22 formed on the annular base 20 around the opening 21; and a second engaging section 23 located inside the first engaging section 22 to cover a partial area of the opening 21. The first engaging section 22 includes an annular wall 221 and a plurality of stoppers 222. As can be seen in FIG. 2, the annular wall 221 includes a neck portion 223 formed with a sideward opened annular groove 225 and a top portion 224 contactable with a radially outer area of the flap 3. The stoppers 222 are located between the neck portion 223 and the annular base 20 and are circumferentially spaced from one another, such that the annular wall 221 is divided by the stoppers 222 into six equally sized fixing zones 226. The second engaging section 23 includes a supporting member 231 connected to an inner side surface of the annular wall 221. The supporting member 231 includes two intersected bars and is substantially in the form of a letter X. A shaft 232 is upward extended from the intersection of the two bars of the supporting member 231.

Figure 3:
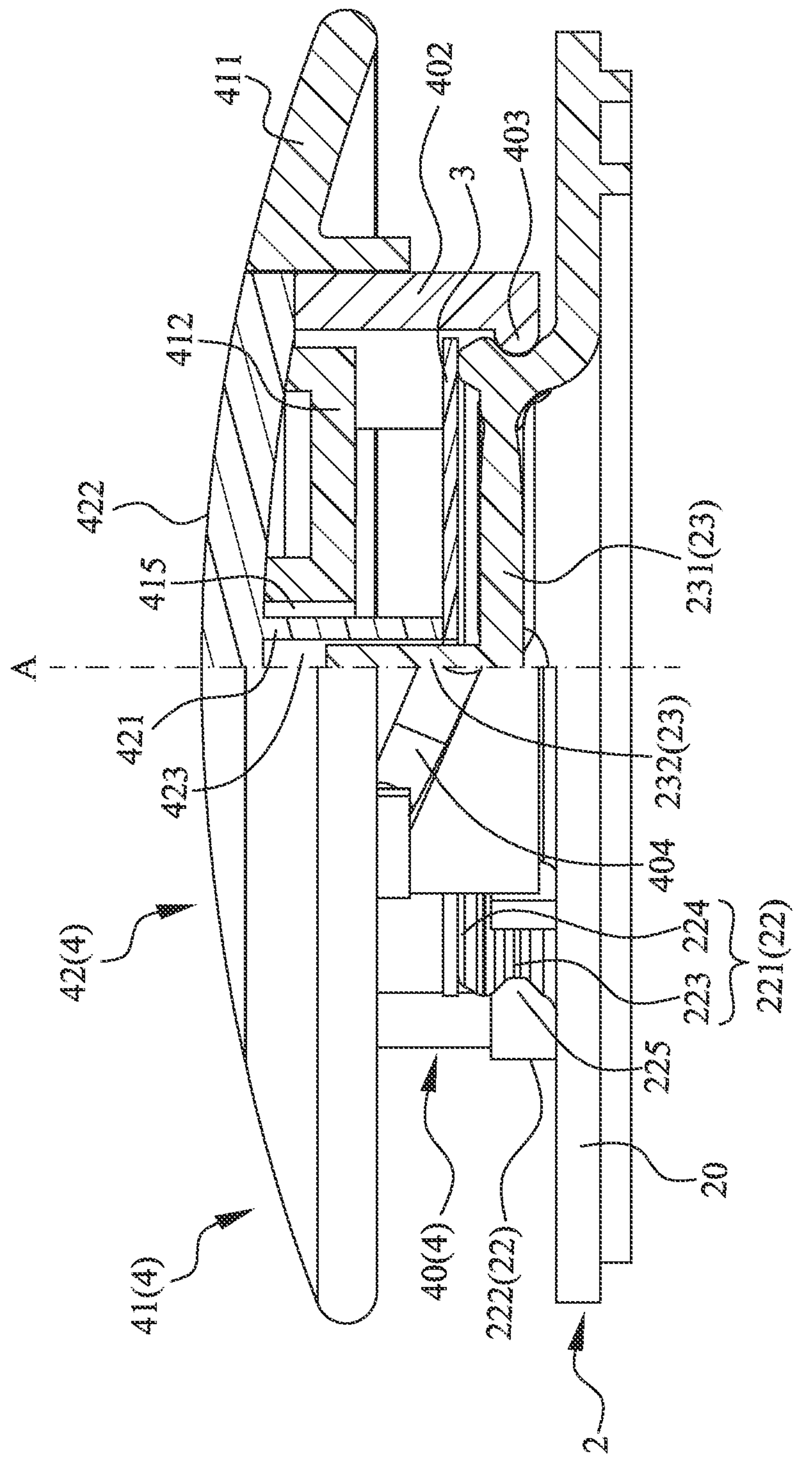
FIG. 3 is a partially sectioned side view of the face mask valve of FIG. 2.

As shown in FIG. 3, the flap 3 is formed with a centered through hole 31 corresponding to the shaft 232. Further, the flap 3 has an outer diameter larger than that of the annular wall 221. When the shaft 232 is extended through the through hole 31, the flap 3 can be located above the opening 21 to cover the entire opening 21, such that the opening 21 is in a blocked state. The flap 3 is made of a flexible material. When a user wearing the breathing face mask 5 exhales, a radially outer area of the flap 3 is pushed by the user's exhaled air F to separate from the annular wall 221, so that the face mask valve 1 is changed into a circulating state, as shown in FIG. 6B.

Please refer to FIG. 2 again. The valve cover 4 includes a fixed member 40, a movable member 41, and a blocking member 42. The fixed member 40 includes a ring portion 401 and three extending sections 402 located below the ring portion 401. The ring portion 401 defines a centered bore. The extending sections 402 are circumferentially spaced from one another, such that a separating space S1 is formed between any two adjacent extending sections 402. It is noted the separating spaces S1 respectively have a width larger than that of the extending sections 402. Further, the extending sections 402 are respectively formed at their lower inner side with a retaining protrusion 403 for engaging with the annular groove 225, and formed at their upper outer side with a guide groove 404. Each of the guide grooves 404 includes a vertical section 405 and a slant section 406 from top to bottom.

The movable member 41 includes a pressing portion 412 and an outer ring portion 411 located around an outer periphery of the pressing portion 412, such that the outer ring portion 411 and the pressing portion 412 together define an extending space S2 between them. A plurality of connecting legs 413 is provided between the pressing portion 412 and the outer ring portion 411, such that the extending space S2 is divided by the connecting legs 413 into six extending zones 414. The pressing portion 412 includes a horizontal area formed with a centered hole 415; and the outer ring portion 411 has a cambered surface. The horizontal area is located lower than the cambered area, so that the connecting legs 413 extend radially from an outer periphery of the horizontal area to an inner periphery of the cambered area in an upward slant direction to connect the horizontal area to the cambered area. And, the outer ring portion 411 has three protruded blocks 416 spaced along the inner periphery of the outer ring portion 411 to radially extend into the extending zones 414.

Please refer to FIG. 3. The blocking member 42 includes a pipe portion 421 sized for inserting into the centered hole 415; and a cap portion 422 disposed on a top of the pipe portion 421 and located adjoining the outer ring portion 411. The pipe portion 421 internally defines an insertion hole 423, which is sized corresponding to the shaft 232. The cap portion 422 covers an area above the fixed member 40 and the extending space S2. The cap portion 422 and the cambered surface of the outer ring portion 411 together form a continuous, substantially dome-shaped surface, giving the valve cover 4 a complete appearance and better visual effect.

To assemble the face mask valve 1 of the present invention, first assemble the fixed member to the movable member, and then place the flap 3 on the valve seat 2 and assemble the fixed member 40 to the valve seat 2. Lastly, connect the blocking member 42 to the valve seat 2.

Figure 4A:
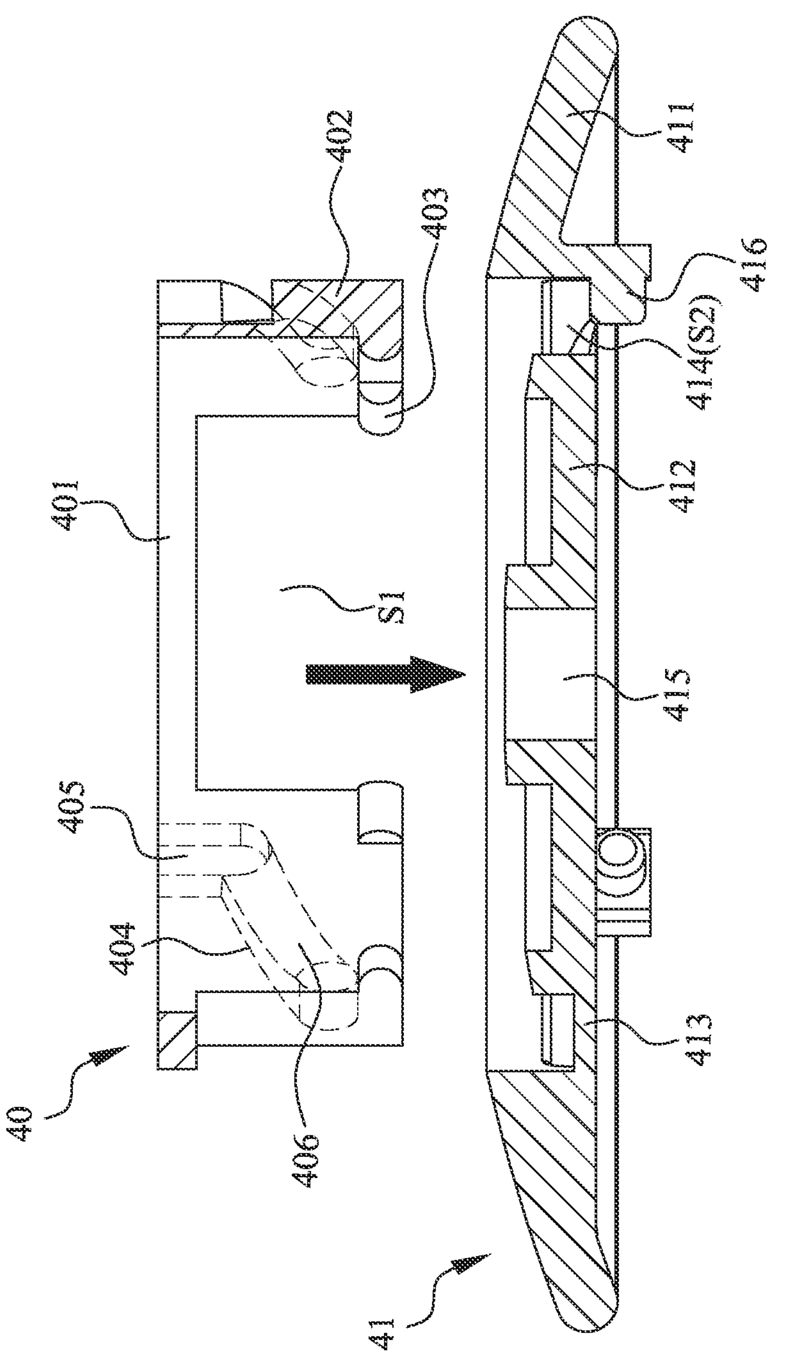
FIGS. 4A to 4D are sectional side views showing the manner of assembling a fixed member to a movable member to form a valve cover of the face mask valve of the present invention.
Figure 4B:
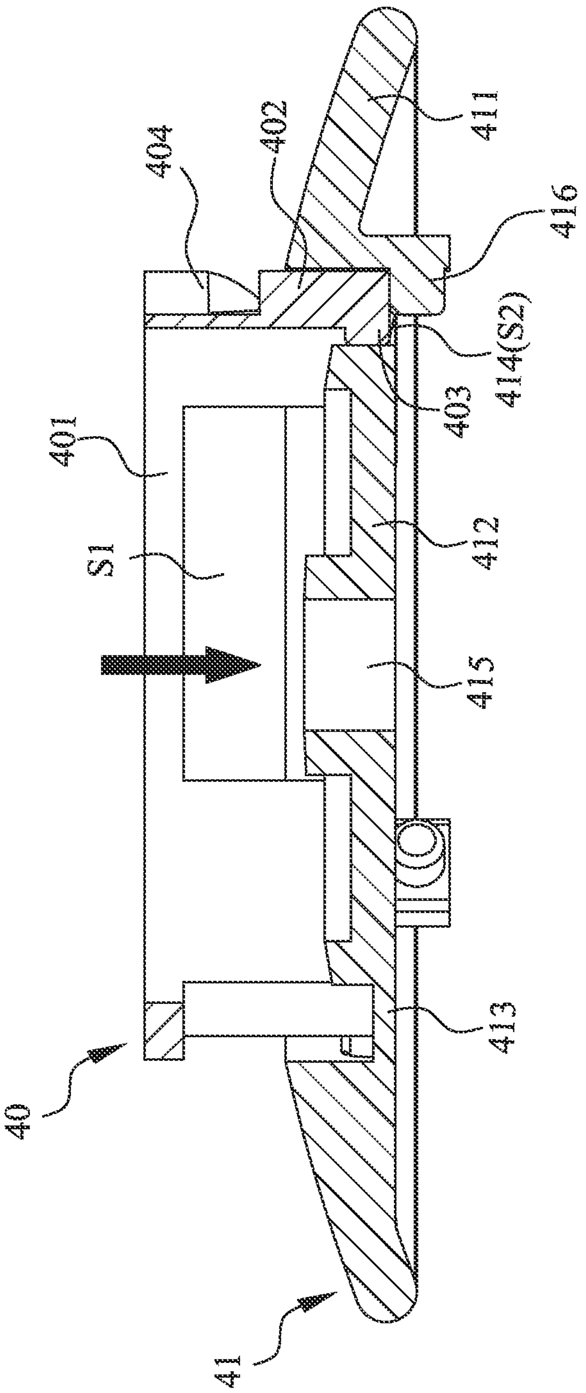

Please refer to FIGS. 4A and 4B. To assemble the fixed member 40 to the movable member 41, first align each of the extending sections 402 with one of the extending zones 414, and then move the fixed member 40 downward for the extending sections 402 to extend through the extending zones 414. The retaining protrusions 403 formed at the lower inner side of the extending sections 402 will first contact with the pressing portion 412 of the movable member 41. At this point, the extending sections 402 are radially outward deformed by the pressing portion 412 into an expanded state.

Figure 4C:
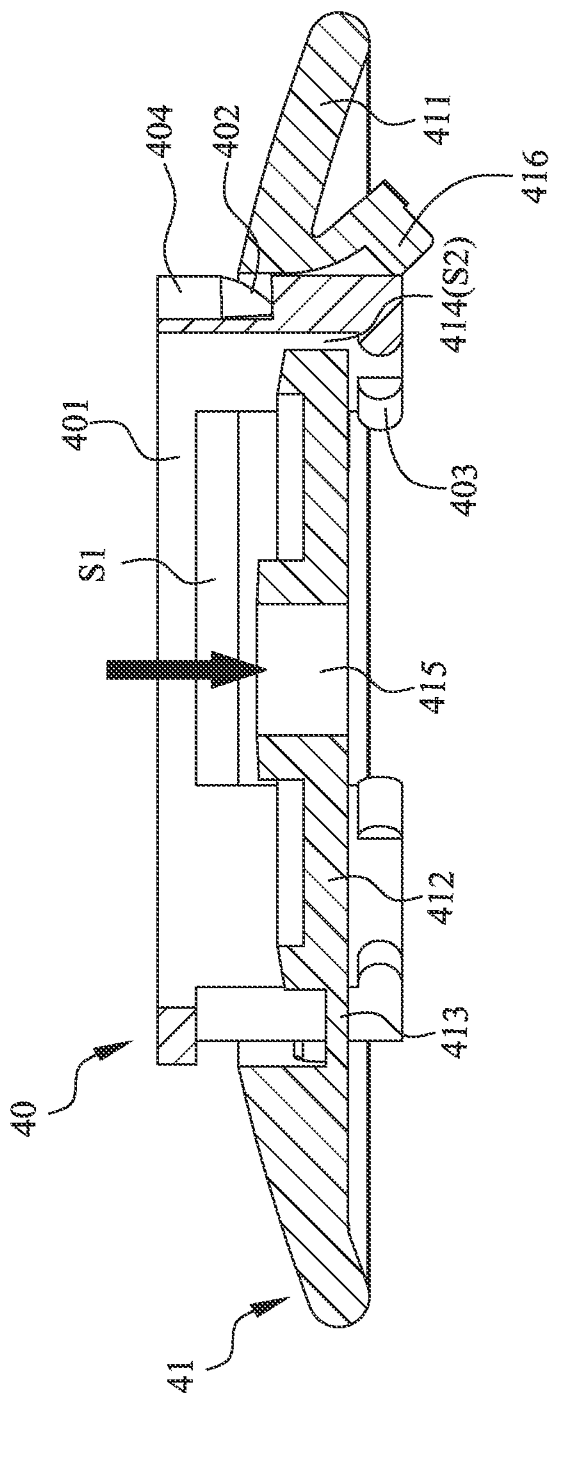

Please refer to FIG. 4C. The extending sections 402 in the radially expanded state further push against the protruded blocks 416, which are spaced along the inner periphery of the outer ring portion 411 and radially extended into the extending zones 414. The protruded blocks 416 being pushed by the extending sections 402 are radially outward bent and deformed, allowing the fixed member 40 to be further moved downward and extended through the movable member 41.

Figure 4D:
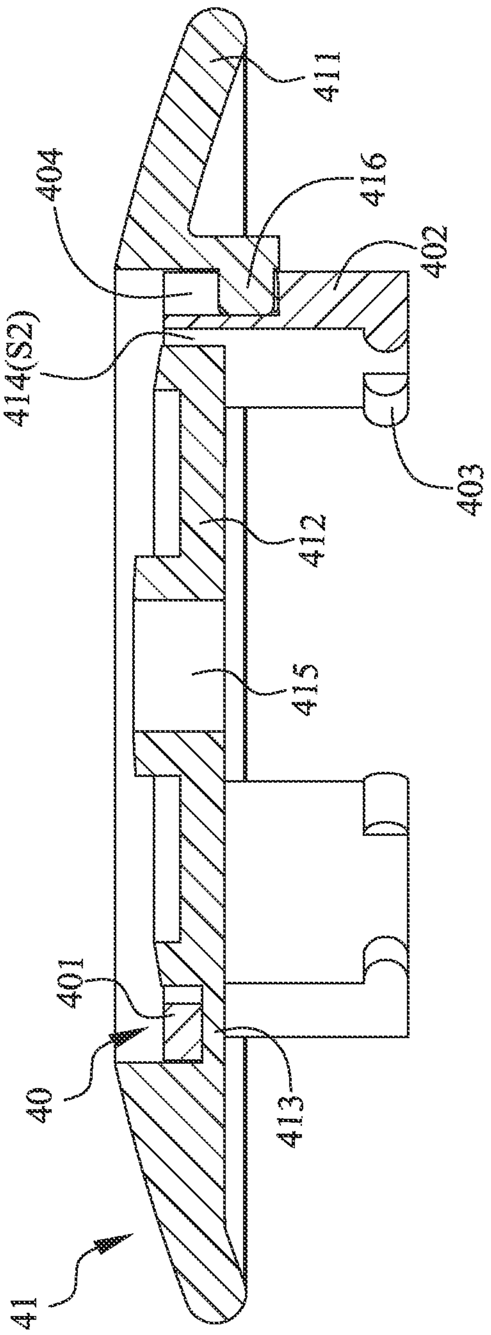

Please refer to FIG. 4D. When the downward moved extending sections 402 reach a position at where the retaining protrusions 403 are located lower than a top of the pressing section 412, the extending sections 402 automatically deform again to move radially inward and return to their original state. The protruded blocks 416 are kept in the deformed state while they are in contact with the downward moving extending sections 402. However, the protruded blocks 416 automatically return from the deformed state to their initial state when they are engaged with the guide grooves 404 formed on the extending sections 402.

Figure 5A:
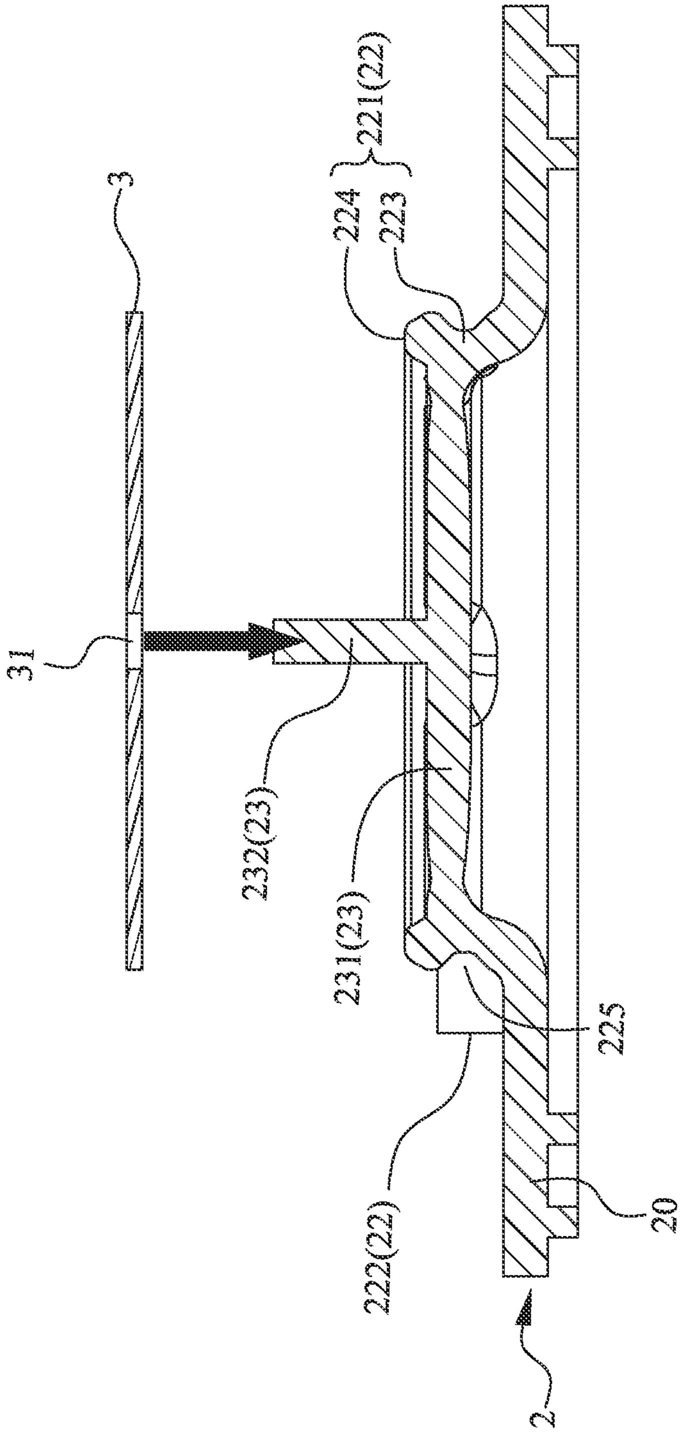
FIGS. 5A to 5E are side sectional views showing the manner of assembling the valve cover, a flap and a valve seat together to form the face mask valve of the present invention.

Please refer to FIG. 5A. To assemble the flap 3 to the valve seat 2, first align the through hole 31 of the flap 3 with the shaft 232, and then extend the shaft 232 through the through hole 31 for the flap 3 to contact with the first engaging section 22 and second engaging section 23 and block the opening 21 on the annular base 20.

Figure 5B:
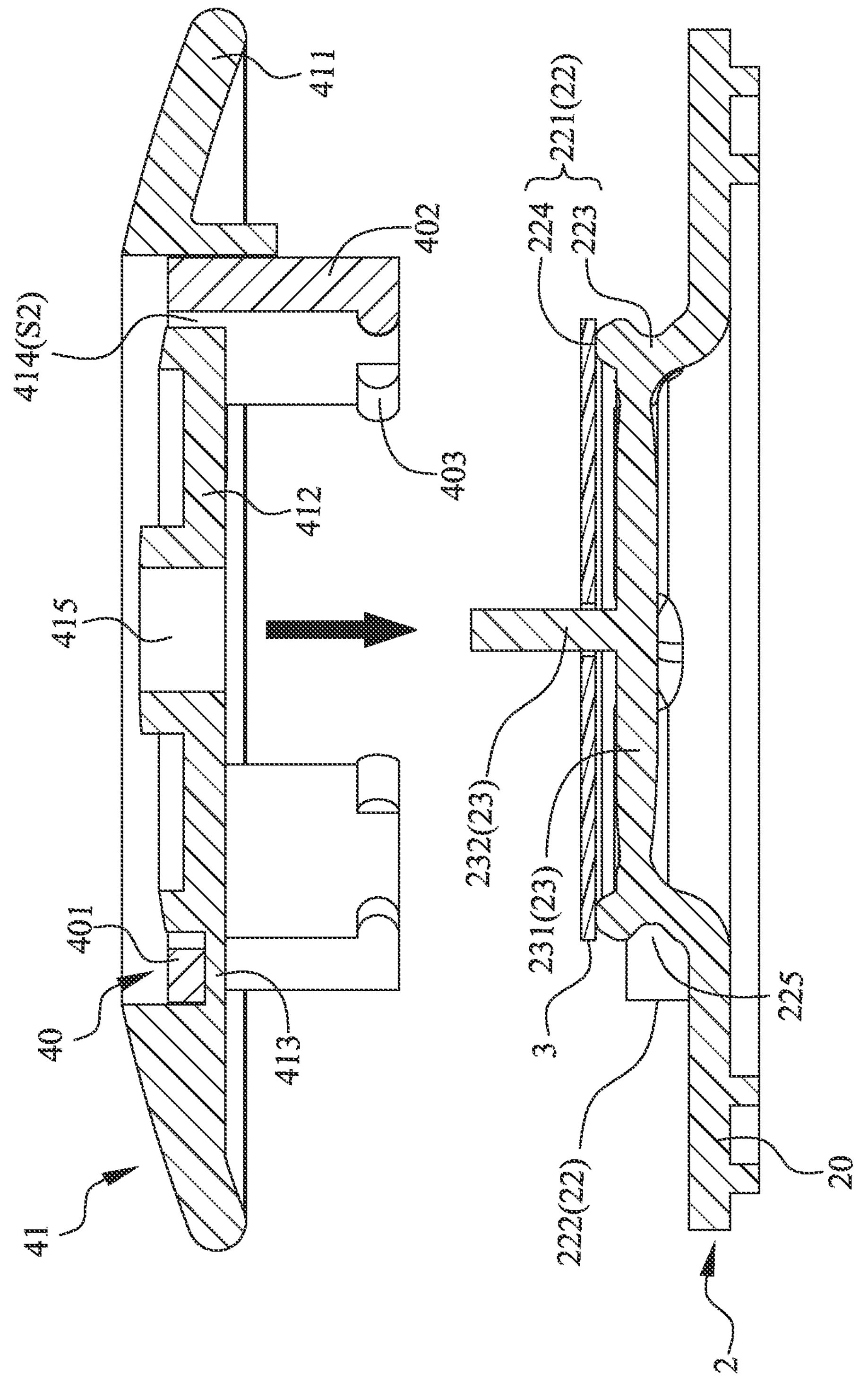
Figure 5C:
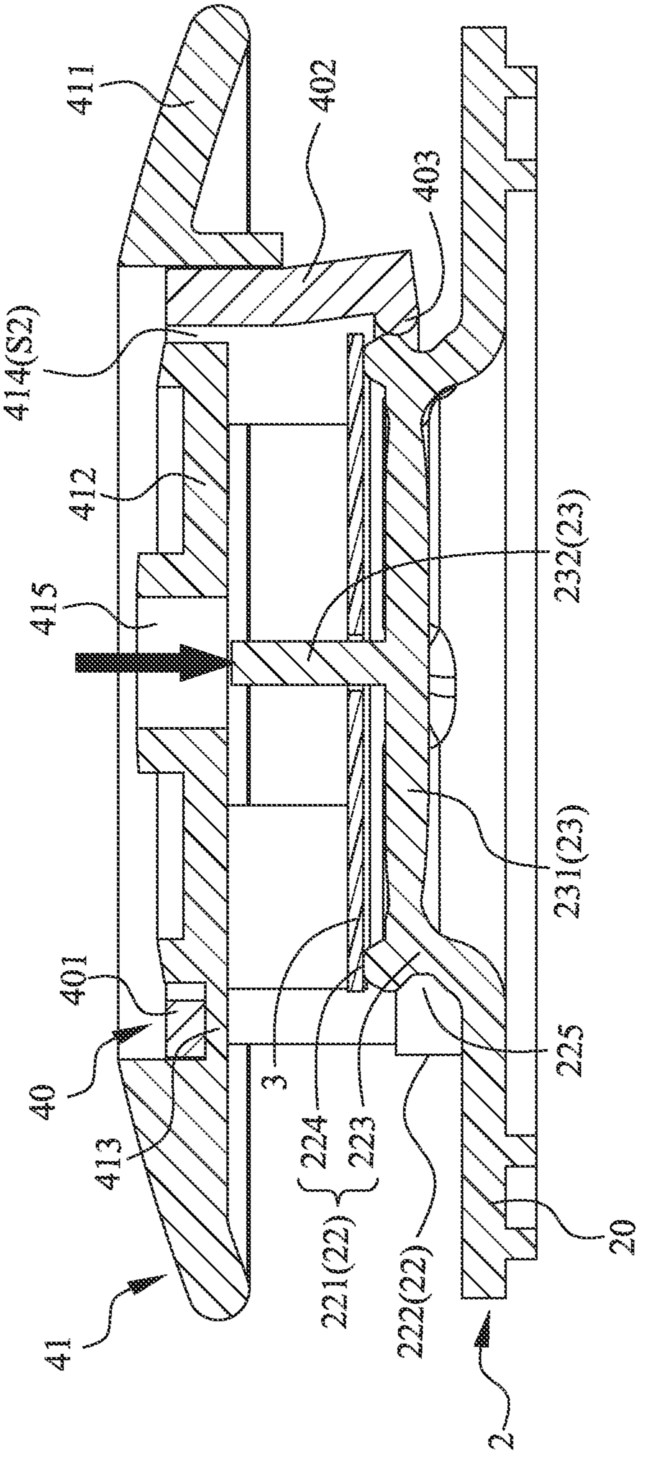

Please refer to FIGS. 5B and 5C. To assemble the fixed member 40 to the valve seat 2, first align each of the extending sections 402 with one of the fixing zones 226 of the annular wall 221. Since there are six fixing zones 226, the fixed member 40 can be assembled to the valve seat 2 in six different cardinal directions. Then, move the fixed member 40 downward until it touches the first engaging section 22. At this point, the retaining protrusions 403 at the lower inner ends of the extending sections 402 are in contact with the top portion 224 of the first engaging section 22, and the extending sections 402 are radially outward pushed and deformed into the expanded state.

Figure 5D:
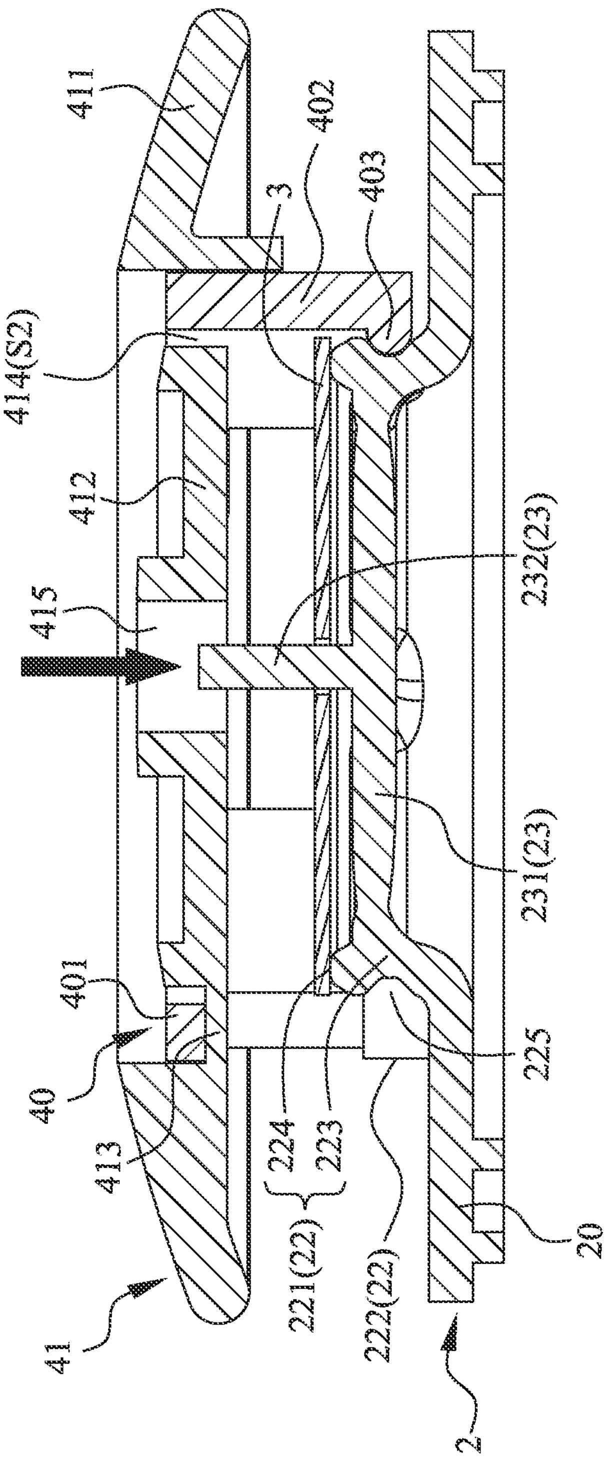

Please refer to FIG. 5D. When the retaining protrusions 403 of the extending sections 402 in the expanded state are moved into the annular groove 225 on the neck portion 223 of the first engaging section 22, the extending sections 402 automatically return from the expanded state into their initial state. At this point, the fixed member 40 is restricted by two of the stoppers 222 and could not move and rotate horizontally. The fixed member 40 is also restricted by the annular groove 225 from moving vertically.

Figure 5E:
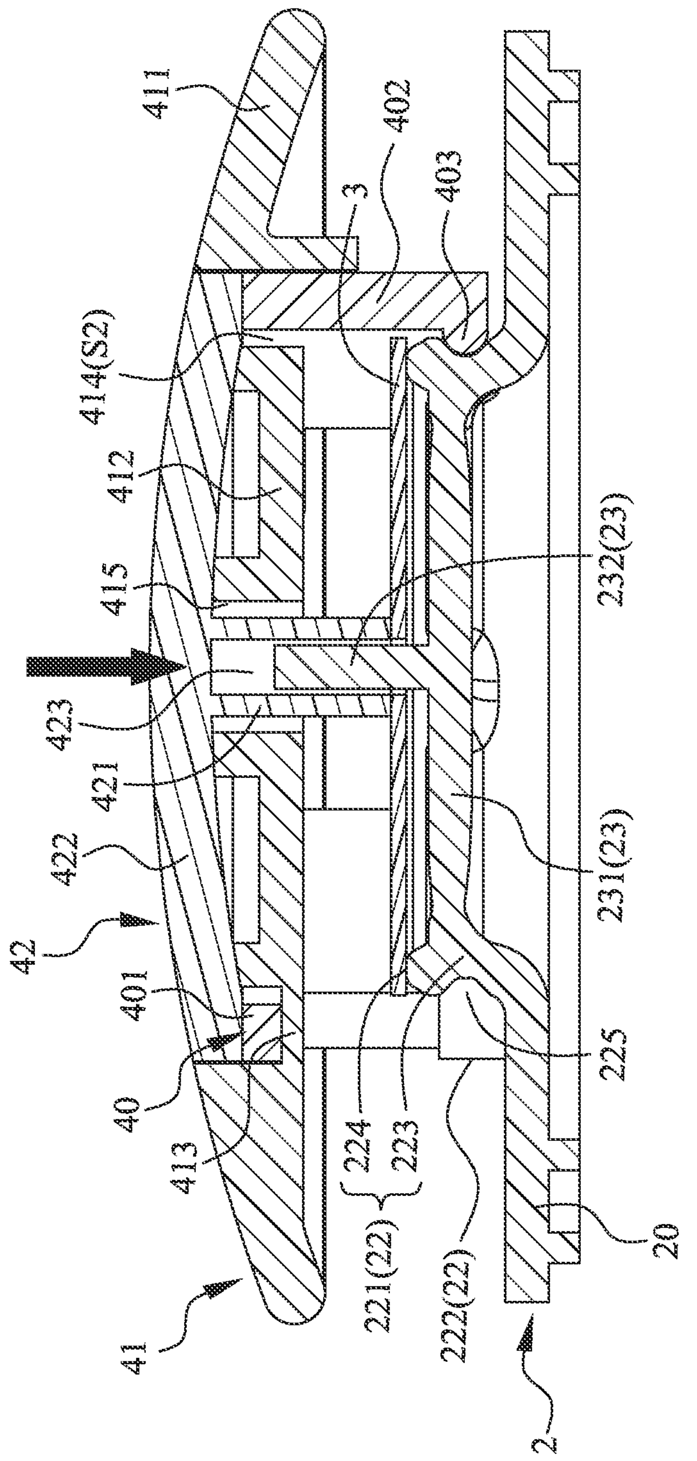

Please refer to FIG. 5E. To assemble the blocking member 42 to the valve seat 2, first align the pipe portion 421 of the blocking member 42 with the centered hole 415 of the pressing portion 412, and then move the blocking member 42 downward into the extending space S2 until the pipe portion 421 touches the flap 3. The cap portion 422 of the blocking member 42 is located inside and adjoining the outer ring portion 411, such that the cap portion 422 of the blocking member 42 and the outer ring portion 411 of the movable member 41 together form the continuous, substantially dome-shaped surface. And, the assembling of the whole face mask valve 1 is completed.

Figure 6A:
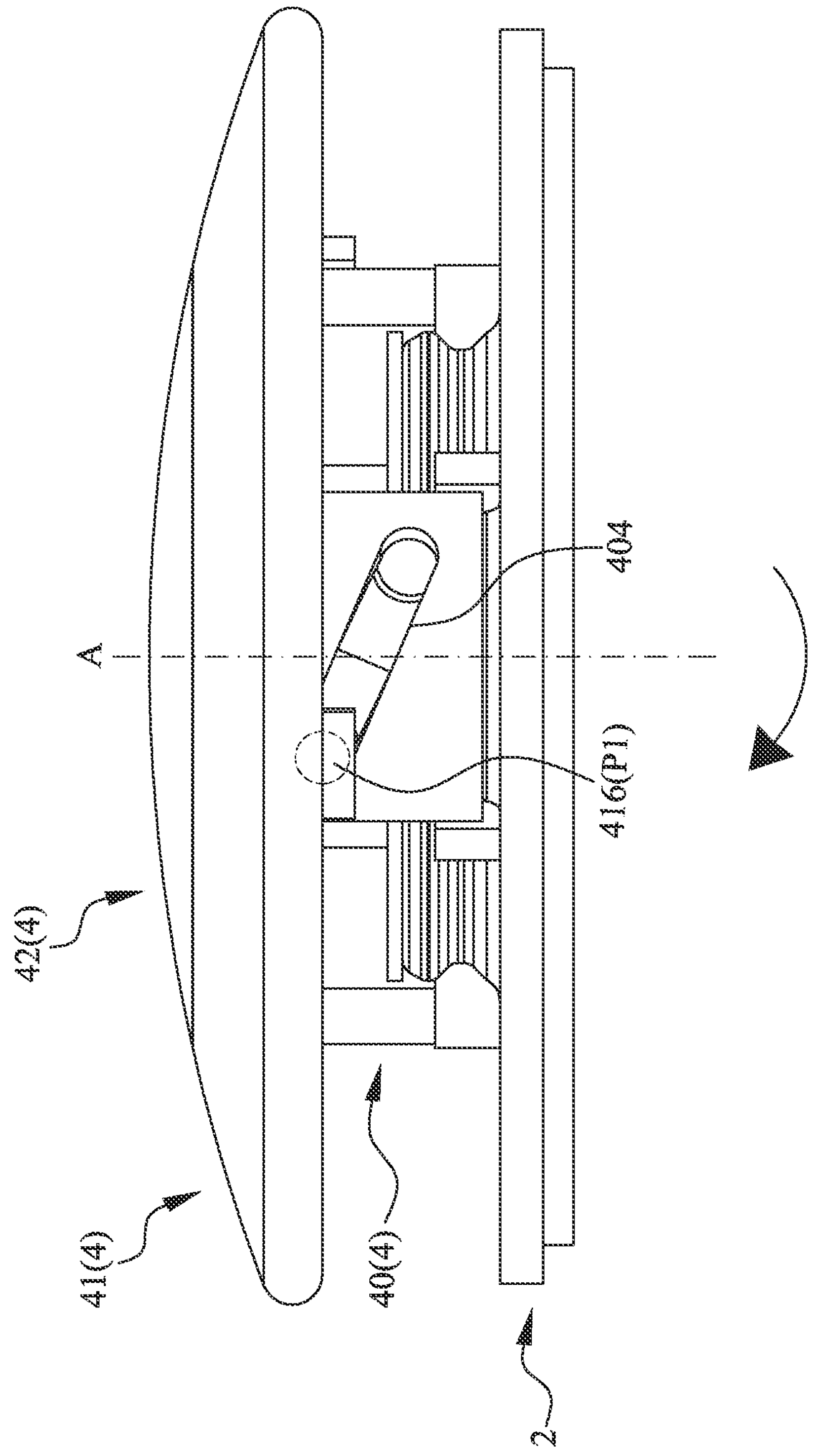
FIG. 6A shows the face mask valve of the present invention is in an open position.
Figure 6B:
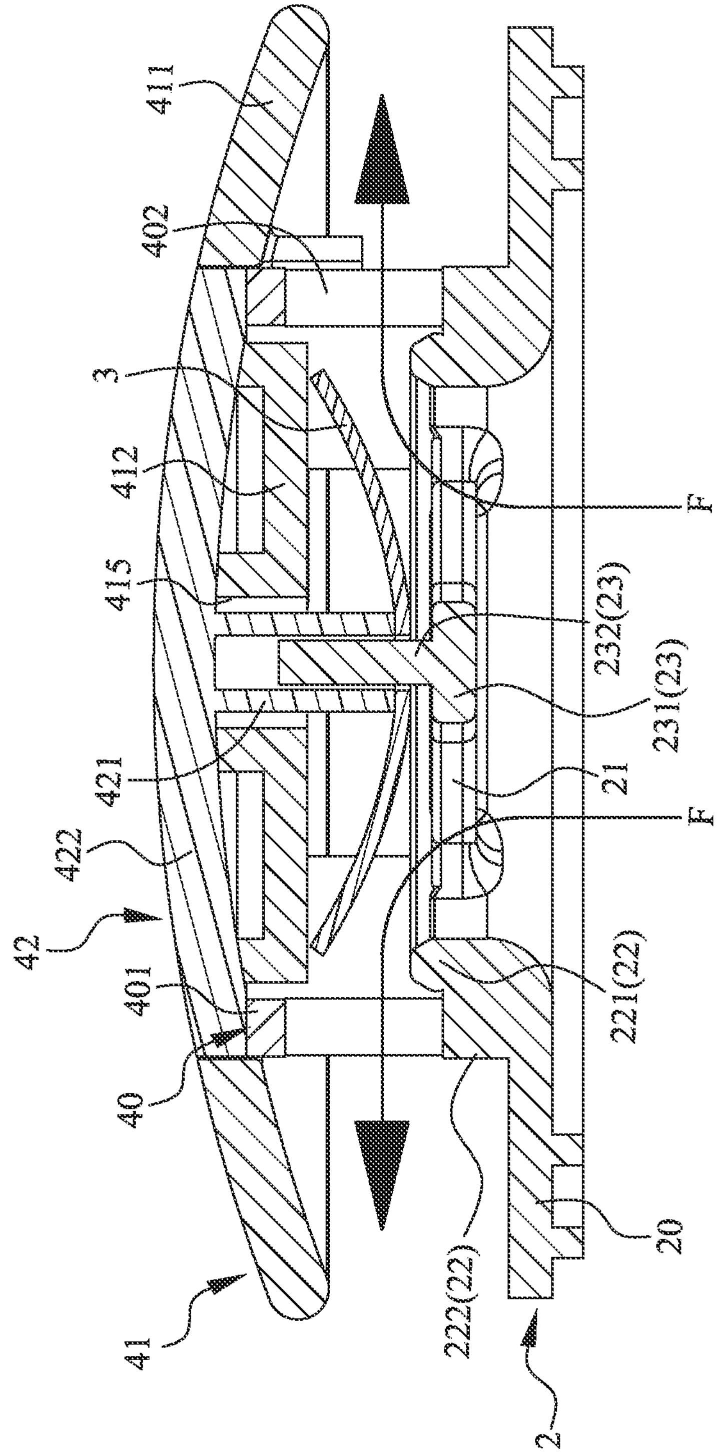
FIG. 6B shows the face mask valve of the present invention changes between a blocked state and a circulating state.

Please refer to FIGS. 6A and 6B. When the movable member 41 of the face mask valve 1 is rotated clockwise about the central axis A, the protruded blocks 416 on the movable member 41 are guided by the slant sections 406 of the guide grooves 404 to move slantly upward, causing the pressing portion 412 to move away from the flap 3 to an open position P1.

Under this condition, when the user wearing the breathing face mask 5 exhales, the exhaled air F flows toward the opening 21. However, since the flap 3 blocking the opening 21 is pressed down by the pipe portion 421 only at a radially inner area thereof, other radially outer area of the flap 3 subjected to a push of the exhaled air F is lifted upward to thereby change the opening 21 from the blocked state to the circulating state.

Figure 7A:
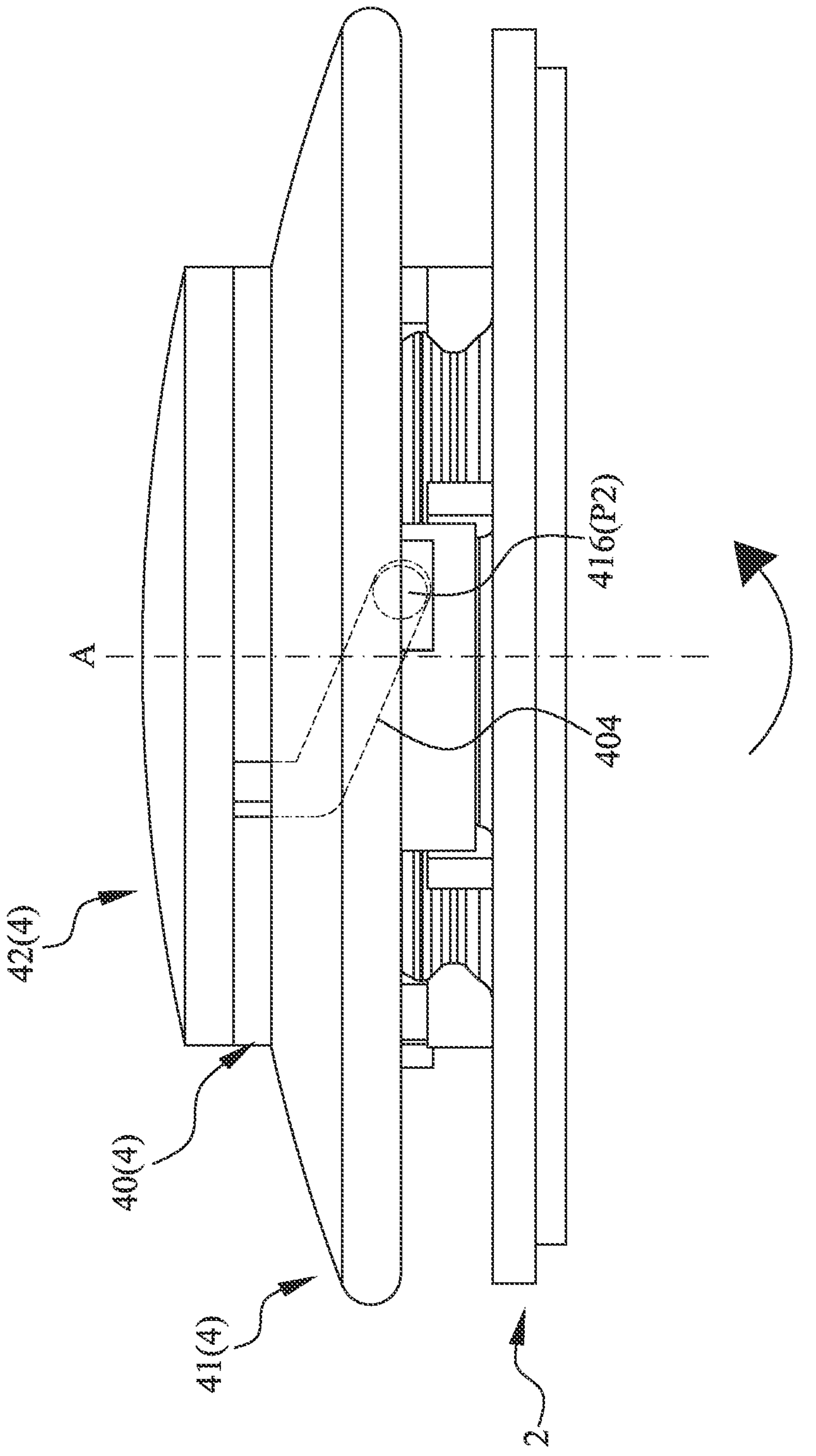
FIG. 7A is a sectional view showing the face mask valve of the present invention in use is in a closed position.
Figure 7B:
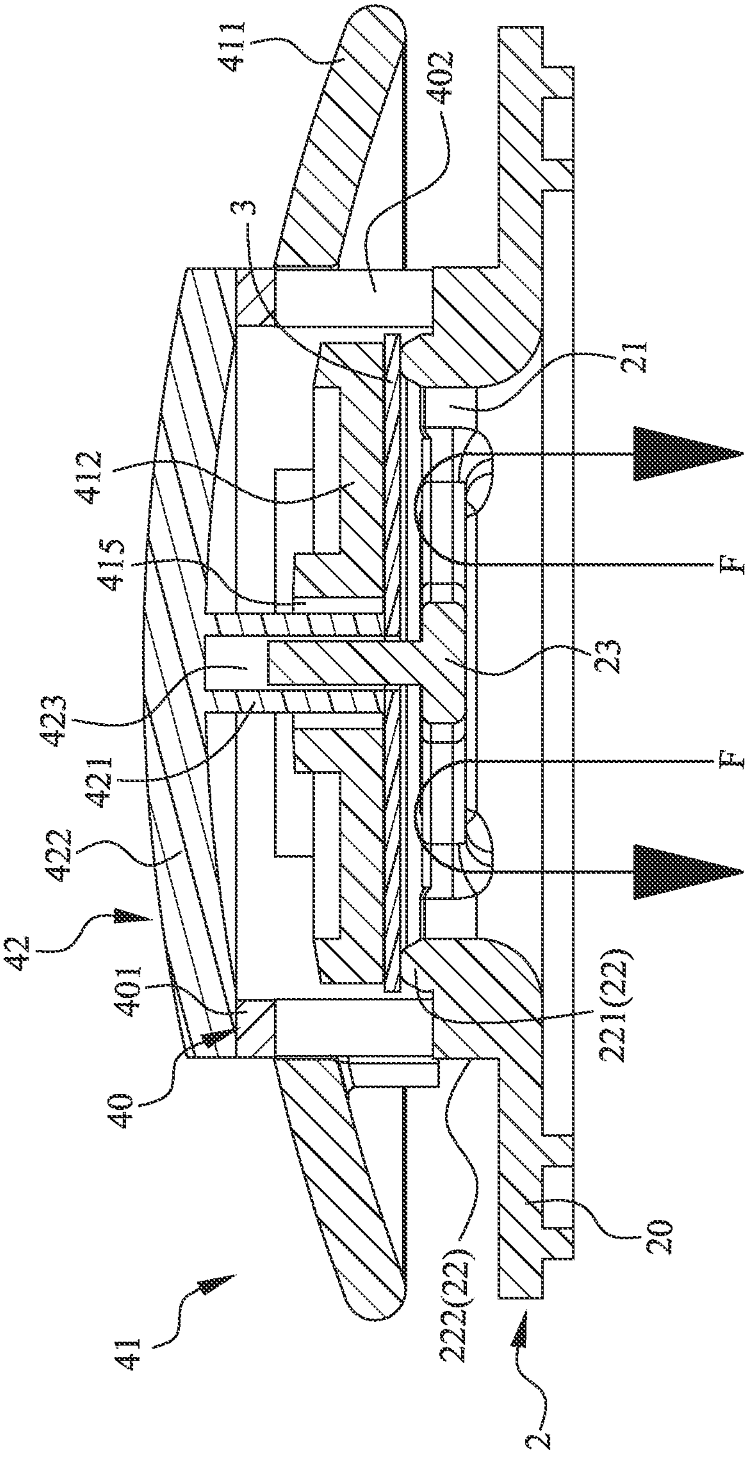
FIG. 7B shows the face mask valve of the present invention is kept in the blocked state.

Please refer to FIGS. 7A and 7B. When the movable member 41 of the face mask valve 1 is rotated counterclockwise about the central axis A, the protruded blocks 416 on the movable member 41 are guided by the slant sections 406 of the guide grooves 404 to move slantly downward, causing the pressing portion 412 to move to a closed position P2 and contact with the flap 3.

Under this condition, when the user wearing the breathing face mask 5 exhales, the exhaled air F also flows toward the opening 21. However, since the whole flap 3 is pressed against the opening 21 by the pipe portion 421 and the pressing portion 412, the exhaled air F flowing toward the opening 21 could not separate the flap 3 from the valve seat 2, and the opening 21 would always be kept in the blocked state.

Figure 8:
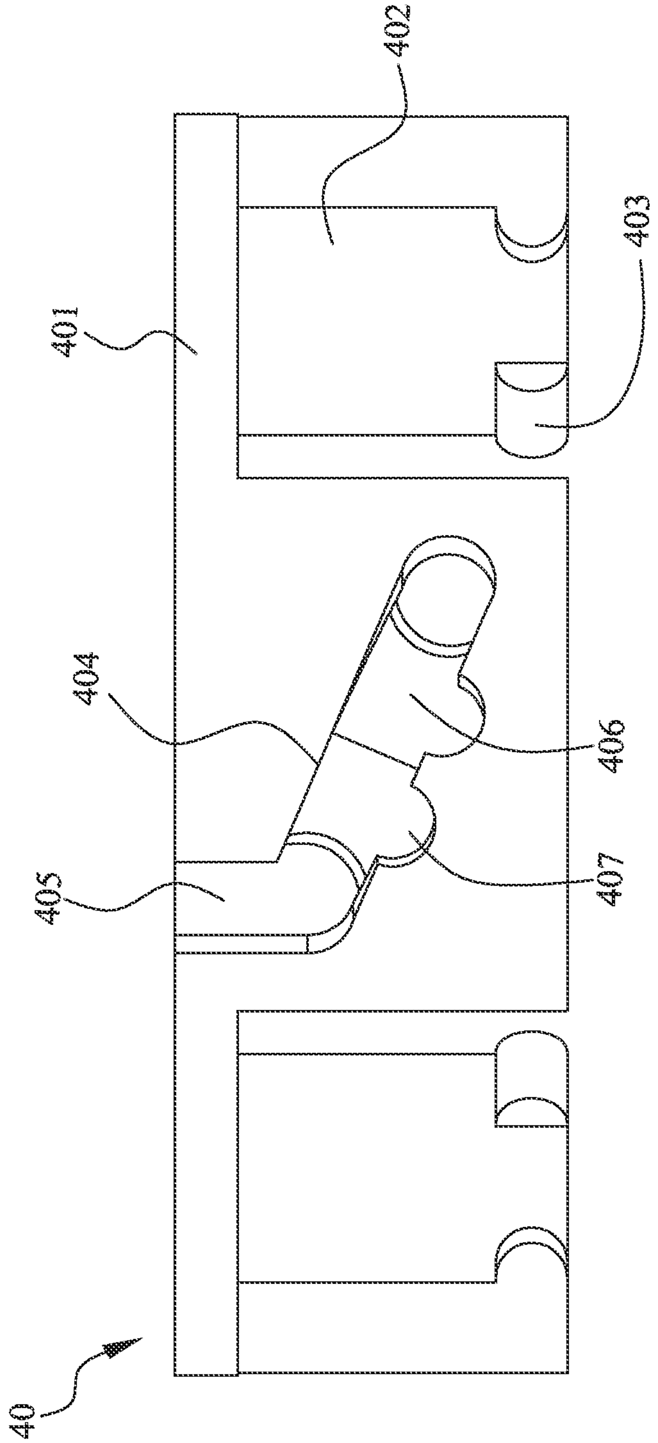
FIG. 8 shows the face mask valve of the present invention includes a guide groove designed as a stepped rail.

Please refer to FIG. 8. For the purpose of letting the user adjust the amount of exhaled air F that can be discharged from the breathing face mask 5 via the face mask valve 1, the guide grooves 404 can be further provided with one or more depressed sections 407 in each of the slant sections 406, such that the pressing portion 412 of the movable member 41 can also be selectively located at an adjustment position (not shown) other than the open position P1 and the closed position P2.

Figure 9:
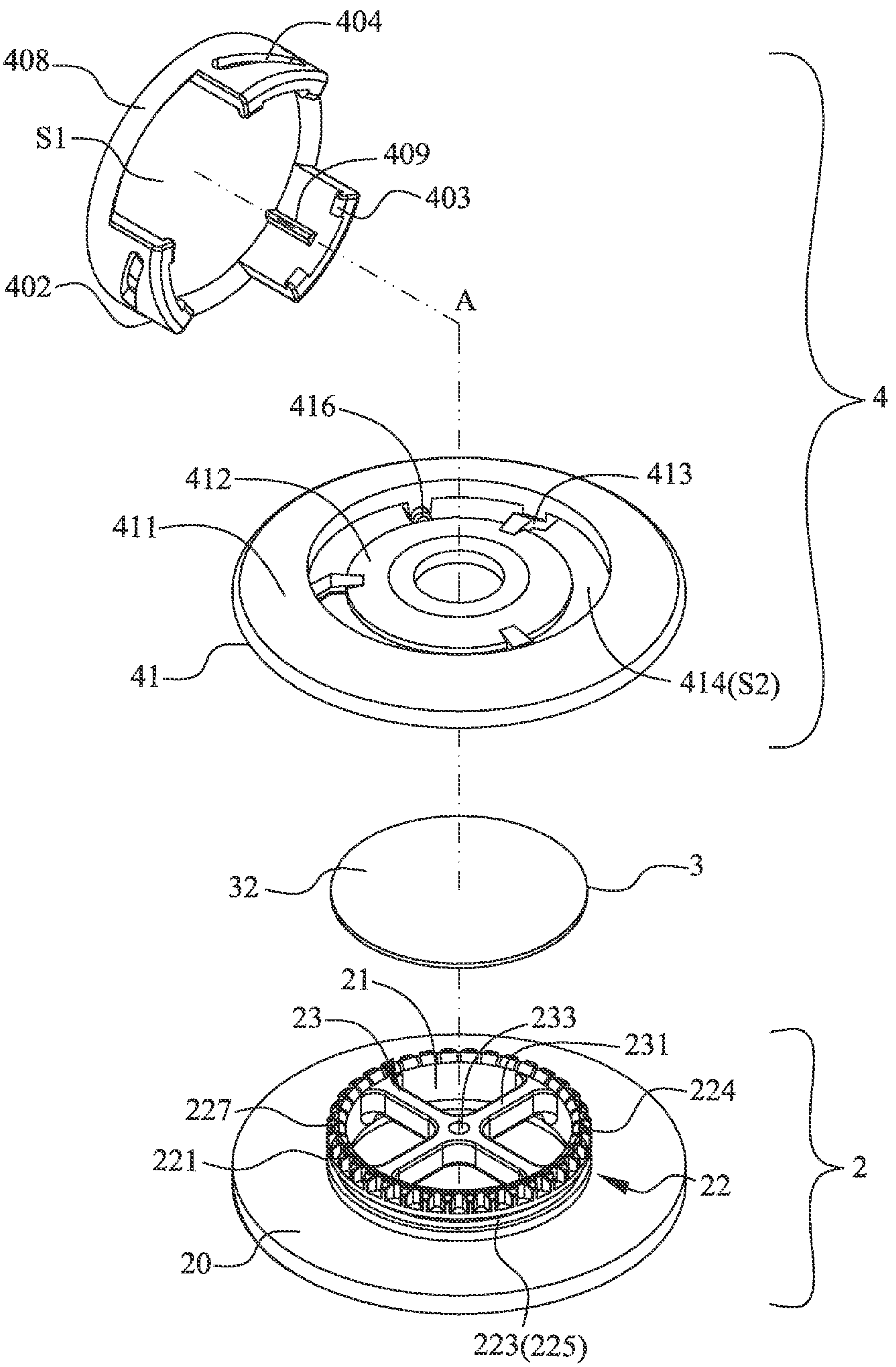
FIG. 9 is an exploded perspective view of a face mask valve according to a second embodiment of the present invention.
Figure 10:
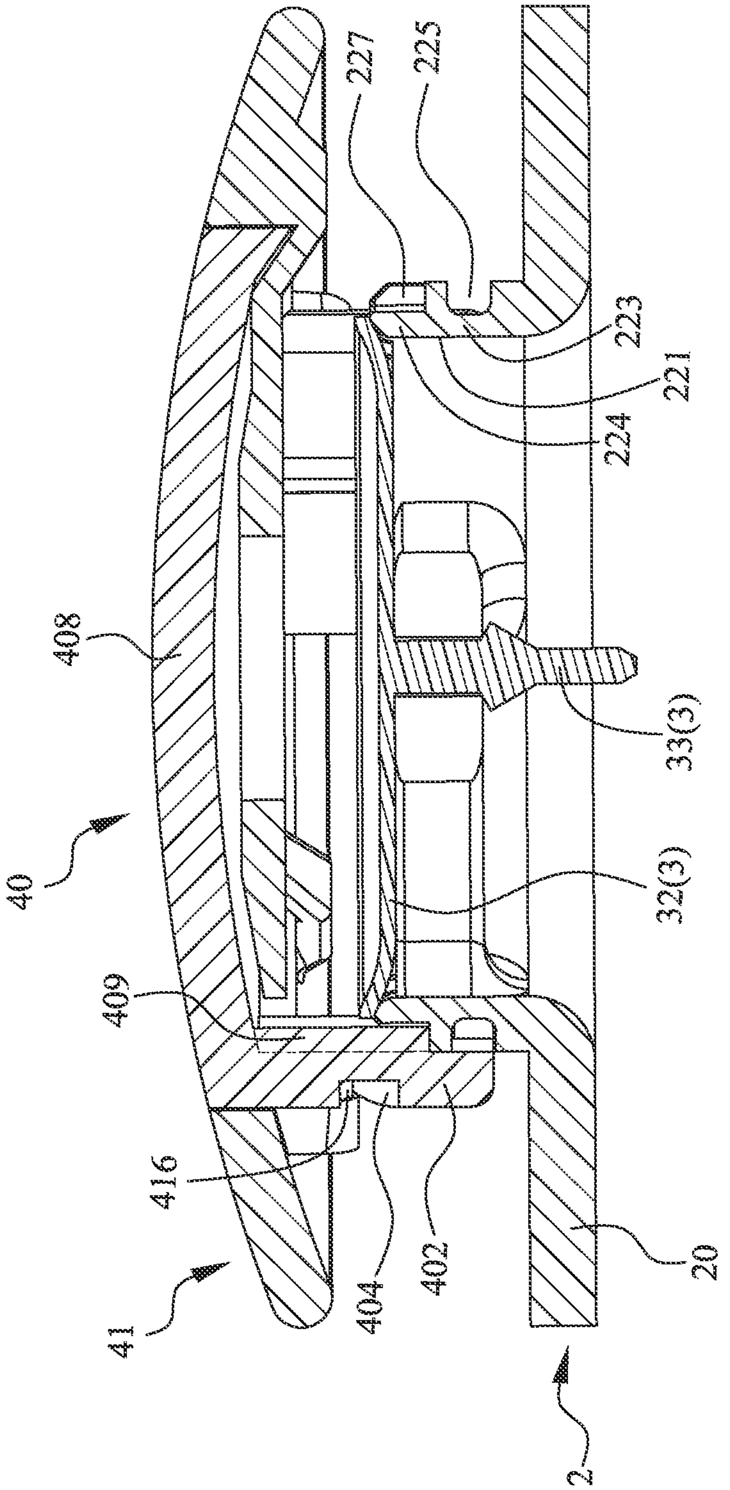
FIG. 10 is assembled sectional side view of the face mask valve of FIG. 9.

Please refer to FIGS. 9 and 10. In a face mask valve 1 according to a second embodiment of the present invention, the valve seat 2 thereof includes a first engaging section 22 that has only an annular wall 221 and a second engaging section 23 that has a supporting member 231 formed with a round hole 233. As shown, the annular wall 221 includes a neck portion 223 formed with a sideward opened annular groove 225, a top portion 224 contactable with a radially outer area of the flap 3, and a plurality of insertion slots 227 formed on along the top portion 224; and the flap 3 thereof includes a flat blocking sheet 32 and a pin 33 downward extended from the flat blocking sheet 32. When the pin 33 of the flap 3 is extended into the round hole 233 and be located in place, a radially outer area of the flat blocking sheet 32 is located adjoining the top portion 224 and the insertion slots 227.

Further, the fixed member 40 of the face mask valve 1 in the second embodiment includes a top cover portion 408 and a plurality of extending sections 402 downward extended from the top cover portion 408. That is, the valve cover 4 in the second embodiment of the face mask valve 1 includes only the fixed member 40 and the movable member 41. As shown in FIG. 9, there are also guide grooves 404 formed on outer surfaces of the extending sections 402. Further, there are also retaining protrusions 403 formed on the lower inner end of each of the extending sections 402 for engaging with the sideward opened annular groove 225, and there is a rib 409 formed on an inner surface of each of the extending sections 402 for engaging with the insertion slots 227, such that the fixed member 40 can be freely connected to the first engaging section 22 of the valve seat 2 in any cardinal direction.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A rotatably adjustable face mask valve, comprising:

a valve seat having an opening located around a central axis of the valve seat and including a first engaging section and a second engaging section provided around the opening;

a flap being mounted on the second engaging section to block the opening; and the flap being deformable by a user's exhaled air to thereby change the opening from a blocked state into a circulating state; and a valve cover including a fixed member and a movable member movable relative to the fixed member; the fixed member having a fixing end that is extended through the movable member to connect to the first engaging section, such that a pressing portion of the movable member is located at a closed position to contact with the flap; and the fixed member and the movable member having at least one protruded block and at least one guide groove provided between them, such that the movable member is rotatable about the central axis to an open position for separating the pressing portion from the flap; and wherein when the pressing portion is moved to the closed position, the opening is kept in the blocked state permanently; and when the pressing portion is moved to the open position, the opening is subject to the user's exhaled air and is changeable between the blocked state and the circulating state.

2. The rotatably adjustable face mask valve as claimed in claim 1, wherein the first engaging section includes an annular wall and a plurality of stoppers; the annular wall including a neck portion formed with a sideward opened annular groove and a top portion in contact with a radially outer area of the flap; the stoppers being circumferentially spaced between the neck portion and a base of the valve seat; and the second engaging section including a supporting member connected to the annular wall of the first engaging section and a shaft extended from the supporting member.

3. The rotatably adjustable face mask valve as claimed in claim 2, wherein the fixed member includes a ring portion and a plurality of extending sections downward extended from the ring portion; the extending sections being formed at their respective lower inner side with a retaining protrusion for engaging with the annular groove, and on their respective outer surface with the at least one guide groove; the annular wall of the first engaging section being divided by the stoppers into a plurality of fixing zones, and the extending sections being circumferentially spaced along the ring portion; and the extending sections being sized corresponding to the fixing zones, such that each of the extending sections can be extended through one of the fixing zones and the fixed member is selectively connectable to the valve seat in different cardinal directions.

4. The rotatably adjustable face mask valve as claimed in claim 3, wherein the movable member further includes an outer ring portion located around an outer periphery of the pressing portion, such that an extending space is defined between the outer ring portion and the pressing portion; the extending space being divided into a plurality of extending zones by a plurality of connecting legs that are provided between the outer ring portion and the pressing portion; and the at least one protruded block being spaced along the outer ring portion to radially extend into the extending zones.

5. The rotatably adjustable face mask valve as claimed in claim 4, wherein the fixed member is extended through the movable member by downward extending the extending sections of the fixed member through the extending zones of the movable member, such that the protruded blocks are pushed by the extending sections to flex radially outward until the protruded blocks are located adjacent to the guide grooves on the extending sections, and then the protruded blocks automatically flex radially inward and move into the guide grooves.

6. The rotatably adjustable face mask valve as claimed in claim 4, wherein the valve cover further includes a blocking member having a pipe portion and a cap portion; the pipe portion being sized for inserting into a centered hole of the pressing portion to be fitted around the shaft on the second engaging section and press against a radially inner area of the flap; and the cap portion blocking an area above the extending space to cooperate with the outer ring portion of the movable member to form a continuous, substantially dome-shaped surface.

7. The rotatably adjustable face mask valve as claimed in claim 1, wherein the at least one guide groove is formed with a vertical section, a slant section, and at least one depressed section located on a lower surface of the slant section, such that the pressing portion can be located at the open position, the closed position or at least one adjustment position that is located between the open position and the closed position.

8. The rotatably adjustable face mask valve as claimed in claim 1, wherein the first engaging section includes an annular wall, the annular has a neck portion formed with a sideward opened annular groove and a top portion with a plurality of insertion slots; the second engaging section including a supporting member connected to the annular wall of the first engaging section and a round hole formed on the supporting member; and the flap including a flat blocking sheet and a pin downward extended from the flat blocking sheet; and the pin of the flap being extendable into the round hole on the second engaging member for a radially outer area of the flat blocking sheet to contact with the top portion of the first engaging section.

9. The rotatably adjustable face mask valve as claimed in claim 8, wherein the fixed member includes a top cover portion and a plurality of extending sections downward extended from the top cover portion; the extending sections being formed on their respective outer surface with the at least one guide groove, and being further formed on their respective inner surface with a retaining protrusion for engaging with the sideward opened annular groove and a rib for engaging with the insertion slots on the first engaging section, such that the fixed member can be freely connected to the valve seat in any cardinal direction.

* * * * *